Sept. 21, 1965   J. V. GILIBERTY   3,207,111
VALVE OPERATING MEANS
Filed Jan. 31, 1964   5 Sheets-Sheet 1

INVENTOR.
JAMES V. GILIBERTY
BY
Max A. Farmer
ATTORNEY

Sept. 21, 1965　　　　J. V. GILIBERTY　　　　3,207,111
VALVE OPERATING MEANS
Filed Jan. 31, 1964　　　　　　　　　　　　　5 Sheets-Sheet 3

INVENTOR.
JAMES V. GILIBERTY
BY
Max H. Farmer
ATTORNEY

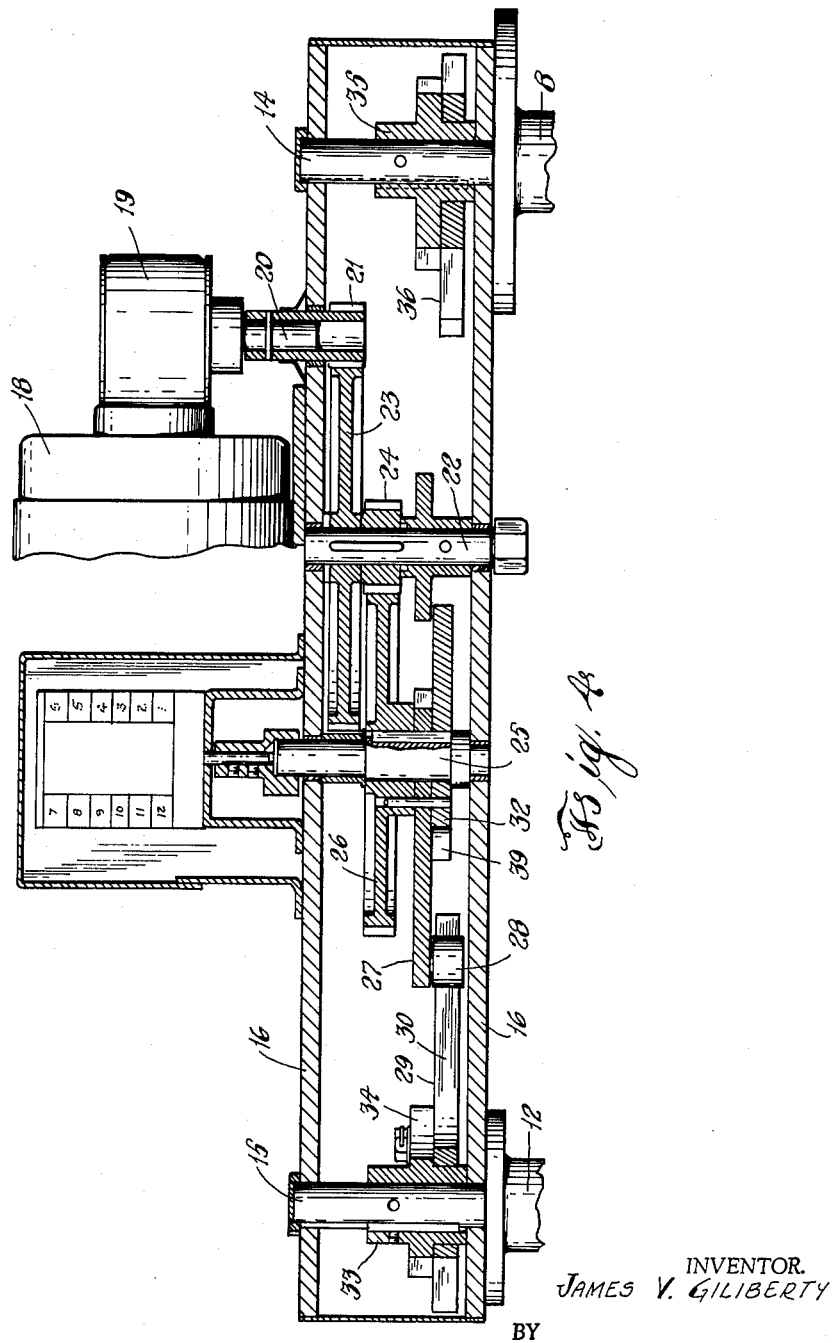

Sept. 21, 1965  J. V. GILIBERTY  3,207,111
VALVE OPERATING MEANS

Filed Jan. 31, 1964

INVENTOR.
JAMES V. GILIBERTY
BY
*Max D. Farmer*
ATTORNEY

United States Patent Office 3,207,111
Patented Sept. 21, 1965

3,207,111
VALVE OPERATING MEANS
James V. Giliberty, West Hempstead, N.Y., assignor to the United States of America as represented by the Secretary of the Navy
Filed Jan. 31, 1964, Ser. No. 341,806
7 Claims. (Cl. 114—121)
(Granted under Title 35, U.S. Code (1952), sec. 266)

The invention described herein may be manufactured by or for the Government of the United States of America for governmental purposes without the payment of any royalties thereon or therefor.

This invention relates to means for alternately operating valves from closed to open positions, and is particularly useful in alternately operating the air supply valves and air vent valves between closed and open positions for the ballast tanks of military landing ships. In such ships when they are about beached, the ballast tanks in the front of the ship are opened to the sea and vented, to enable sea water to enter such tanks and cause that end of the ship to settle somewhat in the water and facilitate its unloading. When it is desired to move such a settled ship, compressed air is delivered to the tank which forces out the water, and the increased buoyancy in the ballast tanks created thereby lifts the ship and enables it then to be easily moved. The vent and air supply valves must never be open at the same time and when the ballast tank is air filled, both of the air supply and air vent valves should be closed.

An object of the invention is to provide improved means for operating the air supply and air vent valves selectively in their proper sequences and holding both closed when maximum buoyancy in the ship is desired, which may be manually or power operated, which positively prevents both of such valves from being open at the same time, and which will be relatively simple, practical, compact and inexpensive.

Other objects and advantages will appear from the following description of one embodiment of the invention, and the novel features will be particularly pointed out in connection with the appended claims.

In the accompanying drawings:

FIG. 4 is a sectional elevation of the same, the section being taken approximately along the line x—x of FIG. 3;

Figure 1:
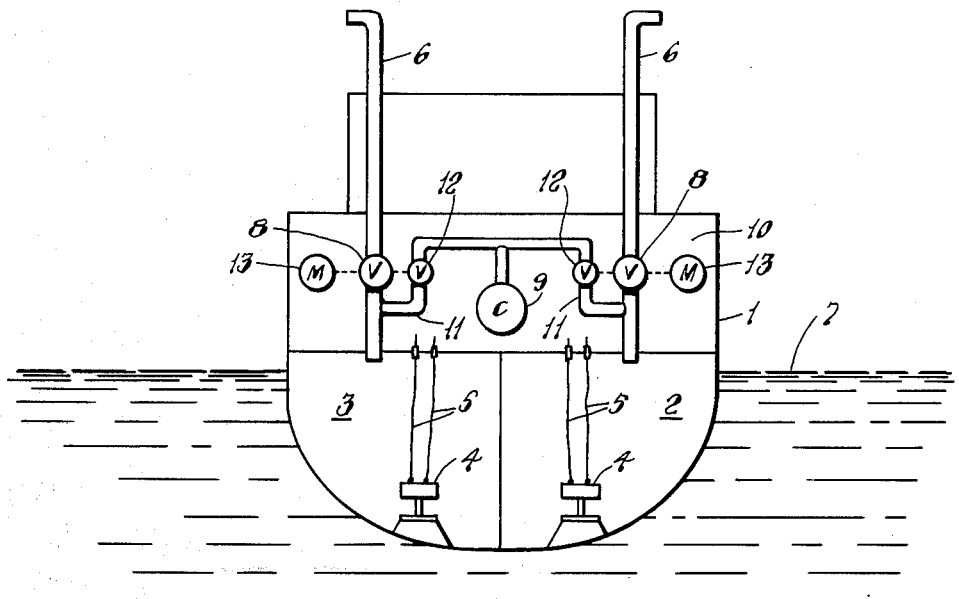
FIG. 1 is a schematic, cross-sectional elevation of a front portion of a landing ship constructed in accordance with this invention.

In the illustrated embodiment of the invention and referring first to FIG. 1, a landing ship 1 is provided with a plurality of ballast tanks 2 and 3, having individual power operated sea valves 4 that are controlled and operated through wires 5 that extend to the upper part of the ship. A vent pipe 6 leads from the upper part of each tank 2 and 3 to a position well above the water line or sea level 7 and is there open. This pipe 6 has a controlling valve 8 therein. A source of compressed air 9 in an upper compartment 10 of the ship is connected by a pipe 11 to each vent pipe 6 between valve 8 and the ballast tank, and pipe 11 has a controlling valve 12 therein. The valves 8 and 12 for each ballast tank may be manually operated, but preferably are mechanically operated by a common motor 13 in a manner to be explained in connection with the other figures of the drawing.

In operation, when such a ship is making a landing, with its ballast tanks filled with air, as soon as it approximately reaches a desired position on the beach, the valves 8 for any number of ballast tanks are opened to vent those tanks, and the sea valves 4 of those tanks also opened. Sea water fills those tanks and the ship settles to facilitate its loading or unloading. When it is desired to move such a ship, the vent valves 8 are closed and valves 12 opened which causes compressed air to enter the ballast tanks and force the water out of those tanks and when they are as empty as desired, the sea valves 4 are closed and also the air supply valves 12 are closed. The air in the ballast tanks lifts the ship by the extra buoyancy created, and then the ship is easily moved.

Figure 2:
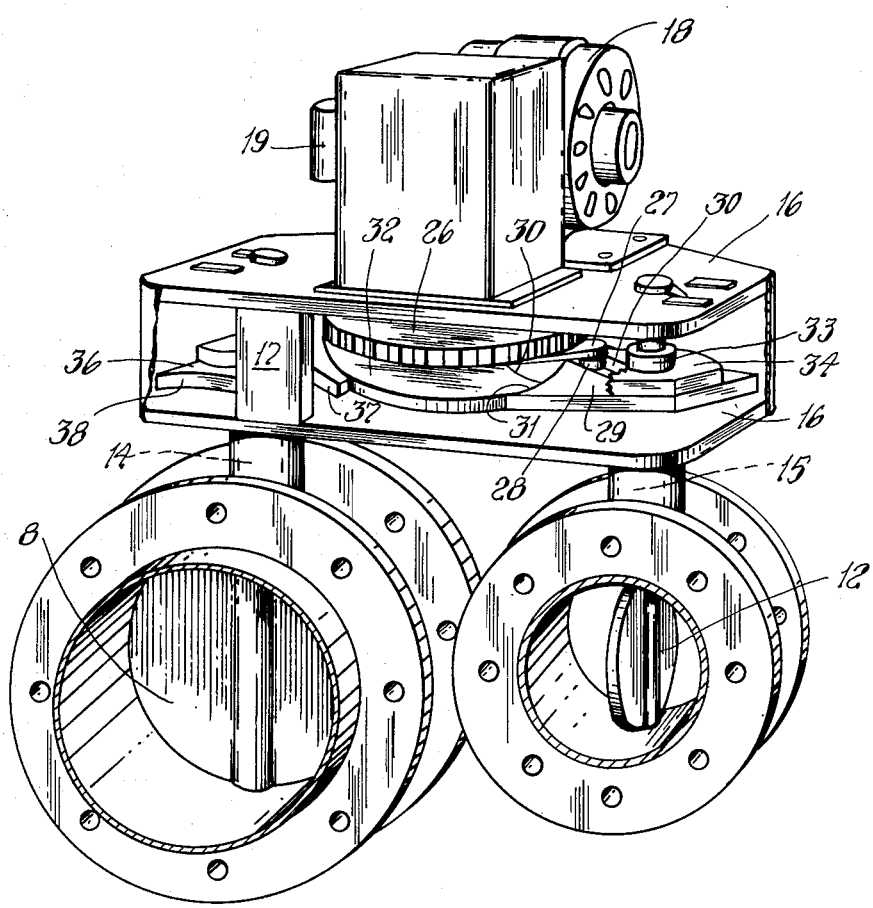
FIG. 2 is a perspective of the valve operating means used therewith.
Figure 3:
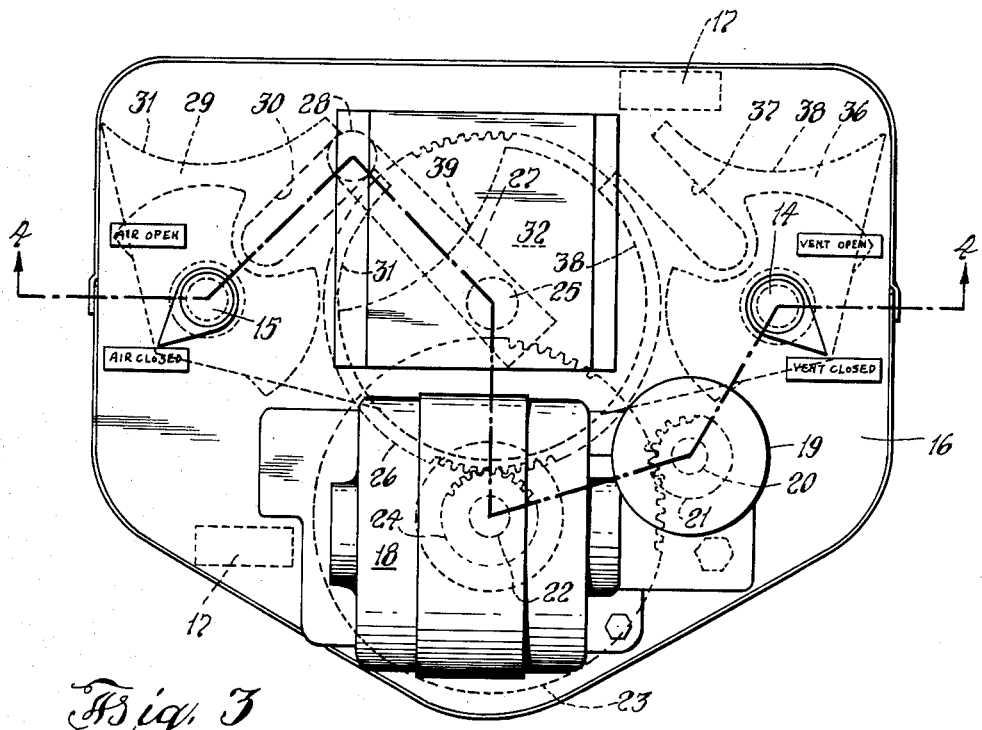
FIG. 3 is a sectional plan of the same.
Figure 6:
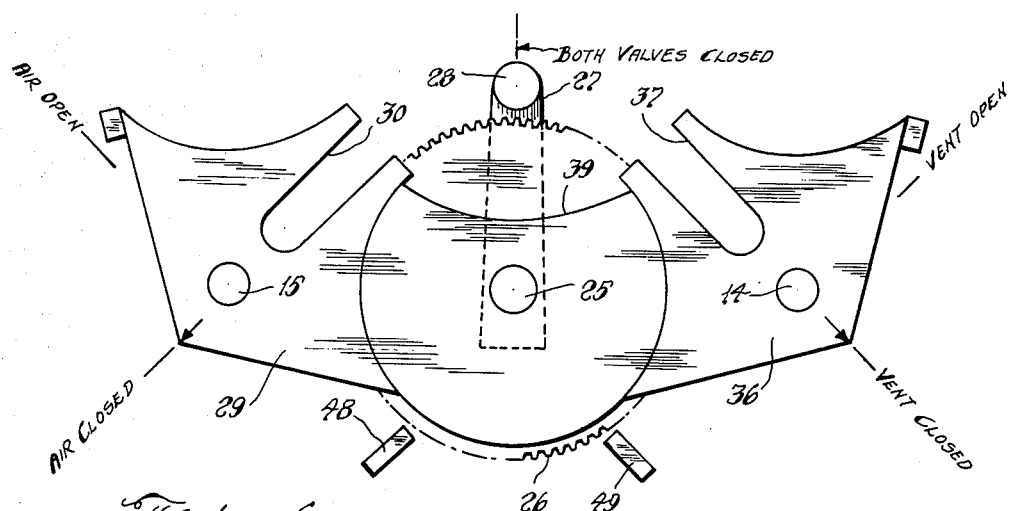
FIG. 6 is a schematic plan of the Geneva type intermittent movement that operates the valves, with the parts in the positions occupied when both valves are closed.

Referring next to FIGS. 2–6, the valve 8 has an operating stem or shaft 14, and the valve 12 has an operating stem or shaft 15. These stems or shafts are parallel to one another and spaced apart at about the same level, and are rotatable in a housing formed of superposed but spaced apart plates 16 that are separated and connected by spacers 17 (FIG. 2). An operating electric, reversible motor 18 is mounted on the upper plate 15 (FIGS. 3 and 4) and through a suitable speed reduction mechanism 19 operates a short shaft 20 which extends downwardly through the upper plate 16 and there carries a pinion 21 fixed thereon. A shaft 22 is disposed between and is rotatably supported by plates 16 and carries fixed thereon as by a spline, a gear 23 which meshes with pinion 21. Shaft 22 also has fixed thereon, as by a spline, a pinion 24. Another shaft 25 is rotatably mounted in the plates 16 and has fixed or splined thereon a gear 26 which meshes with and is driven by pinion 24. Disposed beneath gear 26 on shaft 25 but coupled to gear 26 for rotation therewith is a driver arm 27 of a Geneva type intermittent drive and this arm 27 carries, near its periphery, a roller 28.

Fixed on the shaft 15, between the plates 16, is a driven disc or member 29 of a Geneva type drive, having a notch 30 leading inwardly from an edge and extending radially of shaft 15 and of a width to slidingly receive the roller 28. At each side of the notch 30, the edges of the member 29 have arcuate recesses 31 which fit the peripheral, convex circular surface of a disc 32 which is also mounted on shaft 25 and coupled to arm 27 and gear 26. The radius of curvature of each recess 31 is equal to the radius of curvature of the convex surface of disc 32. A bushing 33 is fixed on shaft 15 and mounts the disc 29 with a flange 34 overlying and coupled to the disc 29.

The valve shafts 14 and 15 are disposed at diametrically opposite sides of the shaft 25, and shaft 14 has a bushing 35 fixed thereon which mounts for rotation with it, a driven disc 36 which is identical with disc 30 and has a notch 37 in which roller 28 may enter and be slidingly received in. Disc 36 also has concave recesses 38, similar to recesses 31 of disc 29, on opposite sides of notch 37 which fit the convex circular edge of the disc 32 when the roller is out of the notch 37, and disc or cam 36 is locked by its recesses 38 against rotary motion except while roller 28 is in the notch and moving disc 36 through a fraction of a revolution. The disc 29 is similarly locked against rotary motion except when roller 28 is in the notch 30 and moving disc 29.

The disc 32 on driver shaft 25 has a concave notch 39 in its periphery, deep and wide enough to receive and pass the tooth or notched part of each disc 29 and 36, while the roller 28 is within the notch 30 of disc 29 or notch 37 of disc 36.

Figure 5:
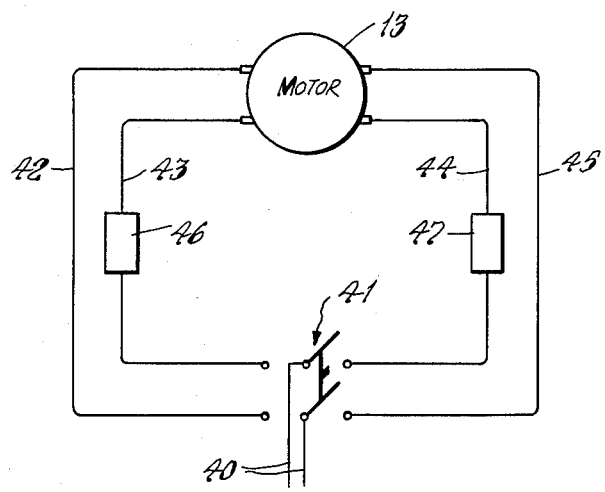
FIG. 5 is a simple wiring diagram for controlling the operation of the valves by a motor.

Referring next to FIG. 5, a simple circuit control of the motor is illustrated. Power lines 40 from a source of electricity are connected to the center contact posts of a double throw, double pole switch 41. The contact posts at one side of the switch are connected by wires 42 and 43 to one side of the motor 13 and when these wires are energized by operation of switch 41 current will pass to the electric motor 13 and cause its operation in one direction. The other pair of end contact posts of switch 41 are connected by wires 44 and 45 to the motor 13 and when energized by operation of switch 41 will deliver current to the motor and cause its operation in the opposite direction. One normally closed limit switch 46 is included in series in wire 43 and another normally closed limit switch is included in series in wire 44. The limit switches are disposed in the path of arm 27 at positions where one is engaged and operated to open position by arm 27 after it has operated valve 12 into closed position, and the other is engaged and operated into open position by arm 27 after it has operated vent valve 8 to open position. Thus when the arm 27 moves from an intermediate position in which both valves are locked against movement, and operates either of the valves, the limit switch will open the circuit to the motor and prevent damage to the motor by any further effort of the motor to continue operation of the valve in the same direction. For manual operation, the motor is disconnected and an operating handle (not shown) affixed to shaft 20. When the arm 27 is out of contact with both discs 29 and 36, both valves will be locked against any movement and in closed positions.

Figure 7:
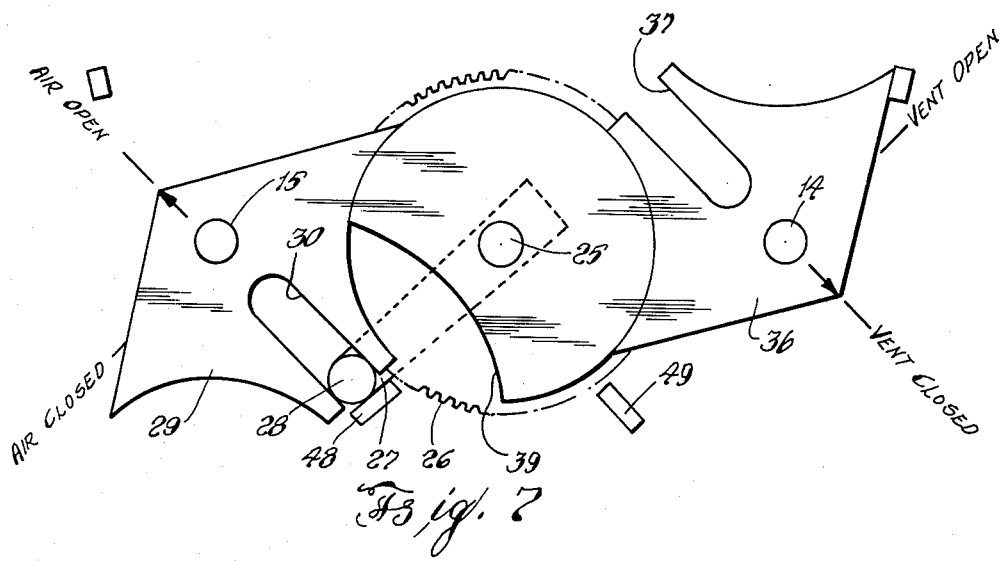
FIGS. 7 and 8 are similar schematic plans showing the parts in different operative positions.
Figure 8:
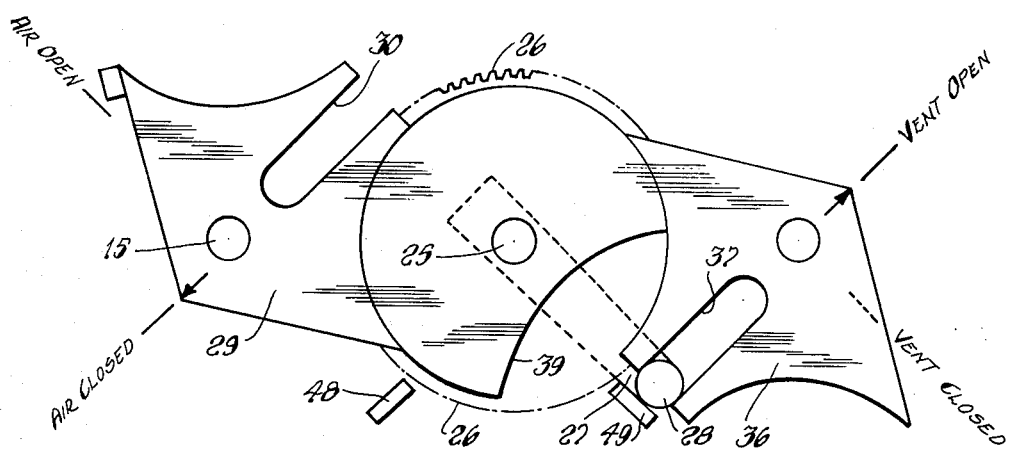

Referring next to the diagrams 6–9, the Geneva movements are illustrated, with both valves locked in closed positions, while the arm 27 is in an intermediate position. When the motor 18 is caused to operate in one direction such as counterclockwise in FIG. 6, the roller 28 will enter the slot 30 and rotate disc 29 clockwise until the other recess in the edge of disc 29 fits against the convex periphery of driver disc 32, at which time a limit switch opens the circuit to the motor, if the main switch 41 is not then opened. This condition is shown in FIG. 7. If the motor instead were operated in the opposite direction, the other disc 36 would have been similarly operated into the position shown in FIG. 8 and the vent valve 8 would have been opened and locked in open position. A stop 48 is disposed in the path of arm 27 after it has operated disc 29 through one step as shown in FIG. 7, and another stop 49 is disposed in the path of arm 27 after it has operated disc 36 through one step, as shown in FIG. 8.

It will be understood that various changes in the details, materials and arrangements of parts, which have been herein described and illustrated in order to explain the nature of the invention, may be made by those skilled in the art within the principles and scope of the invention as expressed in the appended claims.

I claim:

1. A device for alternately opening the air vent and ballast air supply valves of a landing ship which comprises:
    (a) said air supply valve with a rotary operating member,
    (b) said air vent valve with a rotary operating member,
    (c) a rotatable Geneva intermittent motion gear driver disposed between said members and having a driver tooth,
    (d) a Geneva intermittent motion gear driven element coupled to each of said members and arranged around said driver and operated by said tooth through one step and back when said driver is rotated back and forth, from an intermediate position in which both elements are locked against movement by said driver with said valves in closed positions,
    (e) means cooperating with said driver for limiting its rotary movement in both directions beyond that required to operate each driven element for one step, and
    (f) each of said driven elements being coupled to a related operating member in positions to cause both valves to be closed when said driver is in said intermediate position, and to alternately open said valves when the driven element for that valve is operated by the driver.

2. In a landing ship of the type having a ballast tank with selectively operable valve means opening into such tank for flooding it, that improvement for selectively flooding said tank or blowing it which comprises:
    (a) a vent pipe opening into the upper part of said tank and vented above sea level,
    (b) a source of compressed air,
    (c) a pipe connecting said source to said tank,
    (d) each of said pipes having a controlling valve therein with an operating member thereon,
    (e) said members being disposed side by side but spaced apart, and each having the configuration of the driven member of a Geneva type intermittent gear drive,
    (f) a Geneva type driver rotatably mounted between said members, normally holding said members against rotation but operable on said members alternately to turn them through one step when rotated in opposite directions from an intermediate position in which it holds both members locked against rotation, and
    (g) means by which said driver may be operated in both directions to operate said members alternately.

3. In a landing ship of the type having a ballast tank with selectively operable valve means opening into such tank for flooding it, that improvement for selectively flooding said tank or blowing it which comprises:
    (a) a vent pipe opening into the upper part of said tank and vented above sea level,
    (b) a source of compressed air,
    (c) a pipe connecting said source to said tank,
    (d) each of said pipes having a controlling valve therein with an operating member thereon,
    (e) said members being disposed side by side but spaced apart, and each having the configuration of the driven member of a Geneva type intermittent gear drive,
    (f) a Geneva type driver rotatably mounted between said members, normally holding said members against rotation but operable on said members alternately to turn them through one step when rotated in opposite directions from an intermediate position in which it holds both members locked against rotation,
    (g) means for limiting rotation of said driver beyond one step operation of each member, and
    (h) power means connected to said driver for rotating it selectively in either direction.

4. In a landing ship of the type having a ballast tank with selectively operable valve means opening into such tank for flooding it, that improvement for selectively flooding said tank or blowing it which comprises:
    (a) a vent pipe opening into the upper part of said tank and vented above sea level,
    (b) a source of compressed air,
    (c) a pipe connecting said source to said tank,
    (d) each of said pipes having a controlling valve therein with an operating member thereon,
    (e) said members being disposed side by side but spaced apart, and each having the configuration of the driven member of a Geneva type intermittent gear drive,
    (f) a Geneva type driver rotatably mounted between said members, normally holding said members against rotation but operable on said members alternately to turn them through one step when rotated in opposite directions from an intermediate position in which it holds both members locked against rotation,
(g) means for limiting rotation of said driver beyond one step operation of each member,
(h) power means connected to said driver for rotating it selectively in either direction,
(i) said power means being a reversible electric motor, and
(j) circuitry connected to said motor for causing its operation selectively in either direction and enabling stopping of the motor when said driver is in its said intermediate position.

5. In a landing ship of the type having a ballast tank with a selectively operable sea valve, that improvement for selectively flooding such tank or blowing it clear of sea water, which comprises:
(a) a vent pipe opening into the upper part of such tank and vented above sea level,
(b) a source of compressed air,
(c) a pipe connecting said source to said tank,
(d) each of said pipes having a rotatable valve therein,
(e) a Geneva type driver,
(f) a Geneva type driven member connected to and operating each valve,
(g) said driver being operable to rotate said driven members alternately when rotated in opposite directions from an intermediate position in which it locks both members against rotary movement, and
(h) means for limiting rotation of said driver in each direction from said intermediate position beyond an extent necessary to operate one of said members through one step.

6. In a landing ship of the type having a ballast tank with a selectively operable sea valve, that improvement for selectively flooding such tank or blowing it clear of sea water, which comprises:
(a) a vent pipe opening into the upper part of such tank and vented above sea level,
(b) a source of compressed air,
(c) a pipe connecting said source to said tank,
(d) each of said pipes having a rotatable valve therein,
(e) a Geneva type driver,
(f) a Geneva type driven member connected to and operating each valve,
(g) said driver being operable to rotate said driven members alternately when rotated in opposite directions from an intermediate position in which it locks both members against rotary movement,
(h) means for limiting rotation of said driver in each direction from said intermediate position beyond an extent necessary to operate one of said members through one step,
(i) and a reversible motor connected to said driver for operating it selectively in both directions from said intermediate position.

7. The ship according to claim 6, wherein said motor is a reversible electric motor, and circuitry connected to said motor for selectively controlling the direction and extent of operation of said driver by said motor from said intermediate position of said driver.

References Cited by the Examiner

UNITED STATES PATENTS

| | | | |
|---|---|---|---|
| 1,373,329 | 3/21 | Hoar | 114—16 |
| 2,218,014 | 10/40 | Wlochall. | |
| 2,568,330 | 9/51 | Flippin | 114—0.5 |
| 3,158,178 | 11/64 | Fiala et al. | 137—636 X |

MILTON BUCHLER, *Primary Examiner.*

FERGUS S. MIDDLETON, *Examiner.*